United States Patent
Chen

(10) Patent No.: US 11,131,345 B2
(45) Date of Patent: Sep. 28, 2021

(54) BEARING STEEL BALL ASSEMBLY DEVICE

(71) Applicant: NINGBO BAOHENG BEARING FITTINGS MANUFACTURING CO., LTD, Ningbo (CN)

(72) Inventor: Xingguo Chen, Ningbo (CN)

(73) Assignee: NINGBO BAOHENG BEARING FITTINGS MANUFACTURING CO. LTD., Ningbo (CN)

(*) Notice: Subject to any disclaimer, the term of this patent is extended or adjusted under 35 U.S.C. 154(b) by 0 days.

(21) Appl. No.: 16/760,225

(22) PCT Filed: Sep. 18, 2019

(86) PCT No.: PCT/CN2019/106415
§ 371 (c)(1),
(2) Date: Apr. 29, 2020

(87) PCT Pub. No.: WO2020/015767
PCT Pub. Date: Jan. 23, 2020

(65) Prior Publication Data
US 2021/0207659 A1 Jul. 8, 2021

(30) Foreign Application Priority Data

Jul. 19, 2018 (CN) .......................... 201810797042.0
Jul. 19, 2018 (CN) .......................... 201821147861.2

(51) Int. Cl.
*F16C 43/06* (2006.01)

(52) U.S. Cl.
CPC .................................. *F16C 43/06* (2013.01)

(58) Field of Classification Search
CPC ............... F16C 43/06; Y10T 29/49636; Y10T 29/49648; Y10T 29/4968; Y10T 29/49682; Y10T 29/49686
See application file for complete search history.

(56) References Cited

U.S. PATENT DOCUMENTS 1,401,680 A * 12/1921 Dlesk ..................... F16C 33/42
29/724
1,853,665 A * 4/1932 Cramer .................. F16C 43/06
29/724

(Continued)

FOREIGN PATENT DOCUMENTS

CN 2720187 Y 8/2005
CN 204493474 U 7/2015

(Continued)

*Primary Examiner* — Jason L Vaughan
*Assistant Examiner* — Amanda Kreiling
(74) *Attorney, Agent, or Firm* — Tarolli, Sundheim, Covell & Tummino LLP

(57) ABSTRACT

The present invention discloses a bearing ball assembly device comprising a steel ball output unit, a steel ball control unit and a steel ball assembly unit, wherein said steel ball output unit is connected to said steel ball control unit, said steel ball control unit is connected to said steel ball assembly unit, said steel ball output unit delivers steel balls to said steel ball control unit, said steel ball control unit allows a certain number of steel balls to enter said steel ball assembly unit each time, and said steel ball assembly unit embeds steel balls in a bearing retainer. The present invention automatically realize the process of embedding of steel balls in a bearing retainer.

6 Claims, 4 Drawing Sheets

(56) References Cited

U.S. PATENT DOCUMENTS

| | | | | | |
|---|---|---|---|---|---|
| 2,407,016 | A | * | 9/1946 | Kalister | F16C 43/06 29/707 |
| 3,079,678 | A | * | 3/1963 | Willis | F16C 43/04 29/705 |
| 3,103,059 | A | * | 9/1963 | Rozentals | F16C 43/06 29/898.062 |
| 3,378,166 | A | * | 4/1968 | Hoffman | F16C 43/06 221/93 |
| 3,410,453 | A | * | 11/1968 | Joseph | F16C 43/06 221/175 |
| 3,842,472 | A | * | 10/1974 | Rottacker | F16C 43/06 29/898.062 |
| 7,089,654 | B2 | * | 8/2006 | Chiba | B23P 19/001 221/236 |

FOREIGN PATENT DOCUMENTS

| | | | |
|---|---|---|---|
| CN | 105465196 | A | 4/2016 |
| CN | 106624723 | A | 5/2017 |
| CN | 206309800 | U | 7/2017 |
| CN | 108716512 | A | 10/2018 |
| CN | 208503288 | U | 2/2019 |
| JP | 2011194531 | A | 10/2011 |

* cited by examiner

BEARING STEEL BALL ASSEMBLY DEVICE

RELATED APPLICATIONS

The present invention is a U.S. National Stage under 35 USC 371 patent application, claiming priority to Serial No. PCT/CN2019/106415, filed on 18 Sep. 2019; which claims priority of CN 201810797042.0, filed on 19 Jul. 2018 and CN 201821147861.2, filed on 19 Jul. 2018, the entirety of which are incorporated herein by reference.

TECHNICAL FIELD

The present invention relates to the technical field of bearing assembly devices, and in particular relates to a bearing ball assembly device.

BACKGROUND ART

The ball bearing is a rolling bearing using steel balls as rolling elements and mainly comprises four basic elements: ball, inner ring, outer ring and cage or retainer. Embedding steel balls in the retainer is an indispensable process in the assembly of bearings. In this process, steel balls are often embedded into the retainer by manually applying a pressure. Not only this process is time consuming and labor consuming, but also the working efficiency is low. Thus, the production efficiency is greatly lowered.

SUMMARY OF THE INVENTION

(1) Technical Problem to be Solved

The technical problem to be solved by the present invention is to provide a bearing ball assembly device which can automatically embed steel balls into a bearing retainer.

(2) Technical Solution

To solve said technical problem, the present invention provides a bearing ball assembly device, which comprises a steel ball output unit, a steel ball control unit and a steel ball assembly unit, wherein the steel ball output unit is fit-connected to the steel ball control unit, the steel ball control unit is fit-connected to the steel ball assembly unit;

said steel ball output unit delivers steel balls to the steel ball control unit, said steel ball control unit allows a certain number of steel balls to enter said steel ball assembly unit each time, and said steel ball assembly unit embeds steel balls in a bearing retainer.

Wherein, the bearing ball assembly device further comprises a fixing rack, and the steel ball output unit, steel ball control unit and steel assembly unit are arranged on the fixing rack and are distributed in turn from the top down.

Wherein, the steel ball output unit comprises steel ball storage containers and steel ball output pipelines, the pipe diameter of the steel ball output pipelines matches the diameter of steel balls, the tops of said steel ball output pipelines communicate with the bottoms of the steel ball storage containers, and the bottoms of the steel ball output pipelines are fit-connected to the steel ball control unit.

Wherein, the steel ball output unit further comprises a steel ball output actuation unit, and said steel ball output actuation unit actuates steel balls in steel ball storage containers to steadily enter steel ball output pipelines.

Wherein, the steel ball output actuation unit comprises a first pressure unit, a telescopic pressure rod, a lifting plate and steel pipes; the first pressure unit is fixed on the fixing rack, one end of the telescopic pressure rod is fit-connected to the first pressure unit, the other end of said telescopic pressure rod is fixedly connected to the lifting plate, said lifting plate is distributed under the steel ball storage containers, the tops of the steel pipes are vertically inserted from the bottoms of the steel ball storage containers, the bottoms of said steel pipes are fixedly connected to the lifting plate, the steel pipes are distributed in parallel to the telescopic pressure rod, and the hole diameter of said steel pipes matches the diameter of steel balls; the tops of said steel ball output pipelines communicate with the bottoms of the steel pipes;

said first pressure unit controls the telescopic movements of the telescopic pressure rod, said telescopic pressure rod drives the lifting plate to vertically move up and down, and said lifting plate drives the steel pipes to make telescopic movements in the steel pipe storage containers.

Wherein, the steel ball output actuation unit further comprises guide units, said guide unit comprises a guide rod, a spring and a spring mounting seat, the spring mounting seat is fixed on the fixing rack, and the spring is fit-mounted in the spring mounting seat; one end of the guide rod is fixedly connected to the lifting plate and the other end of said guide rod passes through the spring mounting seat and the spring is put on said guide rod; the guide rod is distributed in parallel to the steel pipes.

Wherein, the steel ball control unit comprises a base, a second pressure unit, a telescopic push rod, a guide plate, a pipeline fixing piece and steel ball guide pipes; the base is fixedly mounted on the fixing rack, the second pressure unit is fixedly mounted on the side of the base; one end of the telescopic push rod is fit-connected to the second pressure unit, the telescopic push rod is distributed in parallel to the base, the other end of said telescopic push rod is fixedly connected to the guide plate, and said guide plate touches the top surface of the base; a through steel ball hole is arranged on the guide plate, a through steel ball guide hole is arranged on the base, and the line between the steel ball hole and the steel ball guide hole is parallel to the telescopic push rod; the hole diameter of both the steel ball hole and steel ball guide hole matches the diameter of steel balls, and the depth of said steel ball hole also matches the diameter of steel balls; the pipeline fixing piece is fixed on the base, the bottom of the steel ball output pipeline is fixed on the pipeline fixing piece, the bottom opening of said steel ball output pipeline is interconnected with the top opening of the steel ball hole; the top of said steel ball guide pipe is interconnected with the bottom opening of the steel ball guide hole, and the bottom of said steel ball guide pipe is fit-connected to the steel ball assembly unit;

when the telescopic push rod is driven by the second pressure unit to draw back in position, the bottom opening of the steel ball output pipeline is interconnected with the top opening of the steel ball hole, and at this time, one and only one steel ball goes from the steel ball output pipeline into the steel ball hole; when the telescopic push rod is driven by the second pressure unit to stretch out in position, the bottom opening of the steel ball hole is interconnected with the top opening of the steel ball guide hole, and meanwhile the steel ball in the steel ball hole enters the steel ball guide hole and is delivered to the steel ball assembly unit along the steel ball guide pipe.

Wherein, the steel ball assembly unit comprises a baseplate, a steel ball guide unit, steel ball pressure exerting units and a retainer positioning unit; the baseplate is horizontally fixed on the fixing rack, the steel ball guide unit is fixed on the top surface of the baseplate, the retainer positioning unit is fit-mounted in the middle of the steel ball guide unit, a tapered boss for placing the bearing retainer is arranged at the top of the retainer positioning unit; a plurality of steel ball guide holes whose outer side is high and inner side is low are arranged in the middle of the steel ball guide unit, the diameter of said steel ball guide hole matches the diameter of steel balls, all steel ball guide holes are evenly distributed in a circle array with the central line of the retainer positioning unit as an axis; connection holes whose number is equal to the number of steel ball guide holes are opened at the top of the steel ball guide unit, the bottom of each connection hole communicates with a corresponding steel ball guide hole and the top of each connection hole communicates with a steel ball guide pipe; the number of the steel ball pressure exerting units is equal to the number of the steel ball guide holes and a one-to-one correspondence exists between them, and each steel ball pressure exerting unit embeds a steel ball into the bearing retainer through the matched steel ball guide hole.

Wherein, a positioning mounting hole coaxial with the steel ball guide unit and matching the retainer positioning unit is opened in the middle of the steel ball guide unit, and said retainer positioning unit is put in the positioning mounting hole and is fixedly connected to the bottom surface of the baseplate;

said steel ball guide unit comprises a coaxially distributed base, a steel ball guide disk and a top disk in turn from the top down, said base, steel ball guide disk and top disk are fixedly connected with bolts, and the steel ball guide hole is arranged on the steel ball guide disk;

said steel ball pressure exerting unit comprises an L-shaped bent plate, a third pressure unit and a telescopic pressure rod; one side of the L-shaped bent plate is horizontally fixed to the top surface of the baseplate, and the other side of said L-shaped bent plate is distributed perpendicular to the axis of the corresponding matched steel ball guide hole; the third pressure unit is fixedly connected to the L-shaped bent plate; the front end of the telescopic pressure rod protrudes into the corresponding matched steel ball guide hole and the end of said telescopic pressure rod is fit-connected to the third pressure unit; the telescopic pressure rod can be driven by the third pressure unit to make telescopic movements in the steel ball guide hole.

Wherein, the included angle between the steel ball guide hole and the horizontal plane is 15°.

(1) Advantageous Effects

Compared with the prior art, the present invention can deliver steel balls to the corresponding positions on the bearing retainer one by one and automatically squeeze and assemble steel balls in position to realize the automation of the assembly process of embedding steel balls into a bearing retainer, thus not only effectively reducing the labor consumption, but also effectively improving the working efficiency. The present invention is economic and practicable. The steel ball output unit can continuously output steel balls, while the steel ball control unit can always keep only one steel ball output. In addition, the steel ball assembly unit can not only fix the retainer, but also steadily deliver steel balls to the fixing mounting positions on the retainer and then apply a pressure to embed steel balls in the bearing retainer. In the whole process, the operator only needs to put a retainer in the steel ball assembly unit and then take out the retainer in which steel balls are embedded. Thus, the operation is simple and the working efficiency is high.

DESCRIPTION OF REFERENCE NUMERALS IN THE DRAWINGS

1. Steel ball output unit; 2. Steel ball control unit; 3. Steel ball assembly unit; 4. Steel ball; 5. Fixing rack; 11. Steel ball storage container; 12. Steel ball output pipeline; 13. Steel ball output actuation unit; 21. Base; 22. Second pressure unit; 23. Telescopic push rod; 24. Guide plate; 25. Pipeline fixing piece; 26. Steel ball guide pipe; 31. Baseplate; 32. Steel ball guide unit; 33. Steel ball pressure exerting unit; 34. Retainer positioning unit; 131. First pressure unit; 132. Telescopic pressure rod; 133. Lifting plate; 134. Steel pipe; 135. Guide unit; 211. Steel ball guide hole; 241. Steel ball hole; 321. Steel ball guide hole; 322. Connection rod; 323. Positioning mounting hole; 324. Base; 325 Steel ball guide disk; 326. Top disk; 331. L-shaped bent plate; 332. Third pressure unit; 333. Telescopic pressure rod; 341. Tapered boss; 342. Fourth pressure unit; 343. Vertical telescopic rod; 344. Retainer mounting table; 1351. Guide rod; 1352. Spring; 1353. Spring mounting seat. 342, 343 and 344 matching the positioning mounting hole 323

DETAILED DESCRIPTION OF THE INVENTION

The following further describes the present invention in detail in combination with the drawings and an embodiment. The following embodiment is used to describe the present invention, but not to restrict the scope of the present invention.

Figure 1:
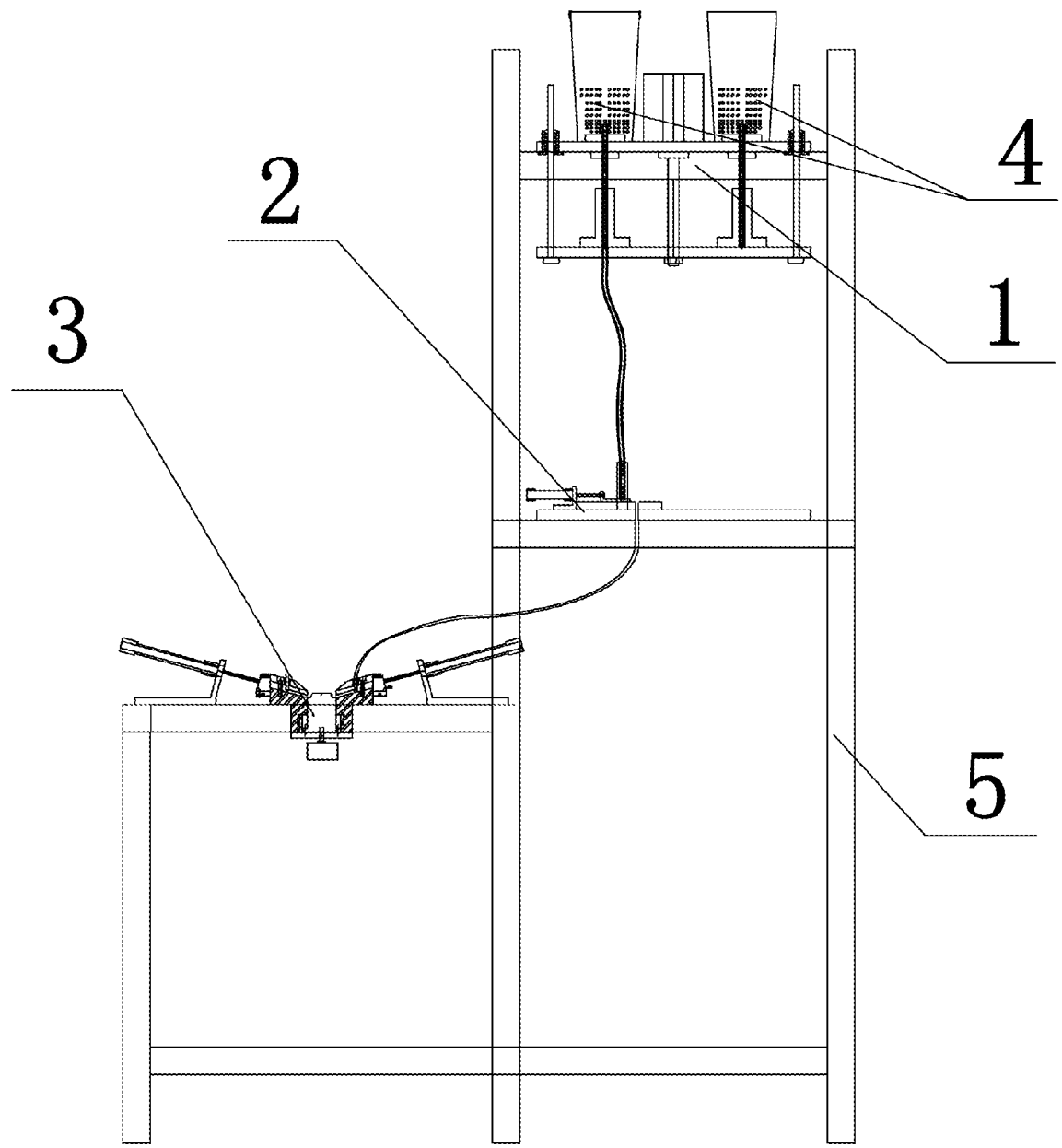
FIG. 1 shows the structure of the bearing ball assembly device in the present invention.
Figure 2:
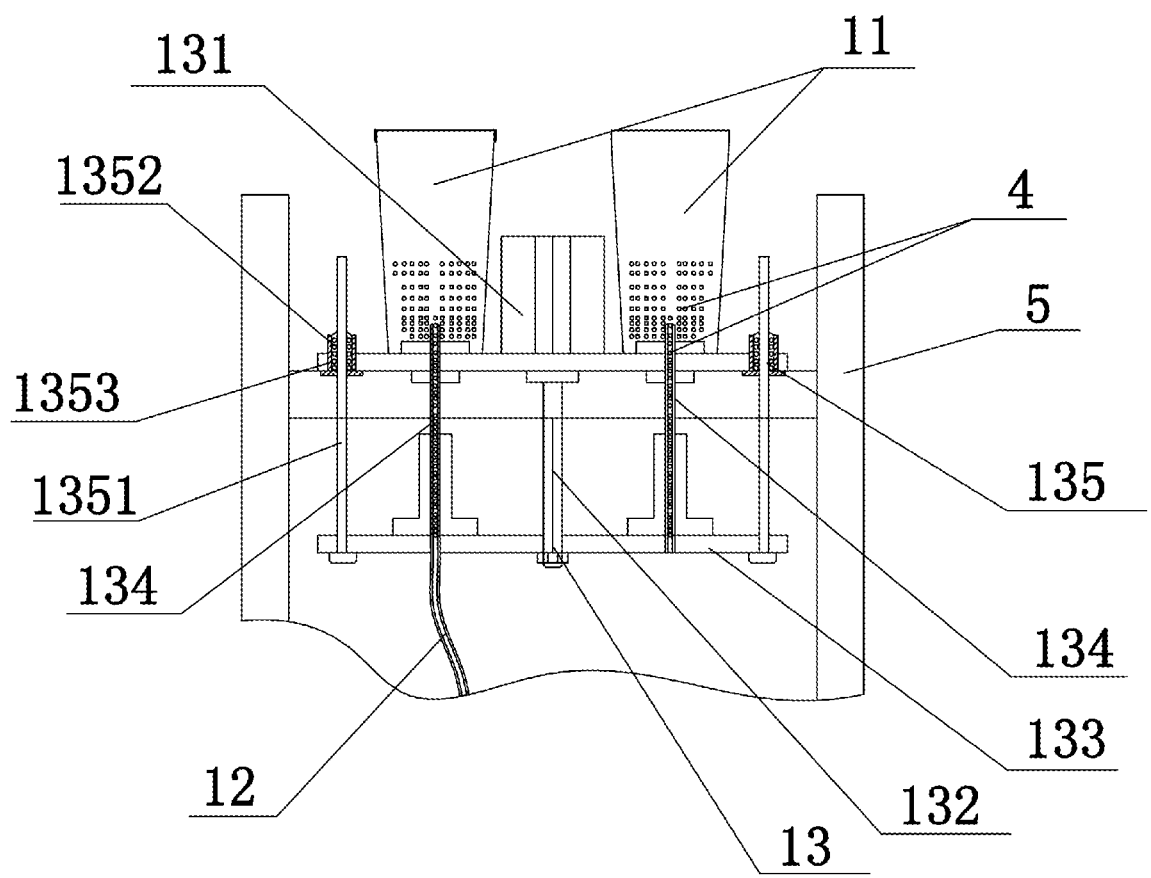
FIG. 2 shows the structure of the steel ball output unit in the present invention.
Figure 3:
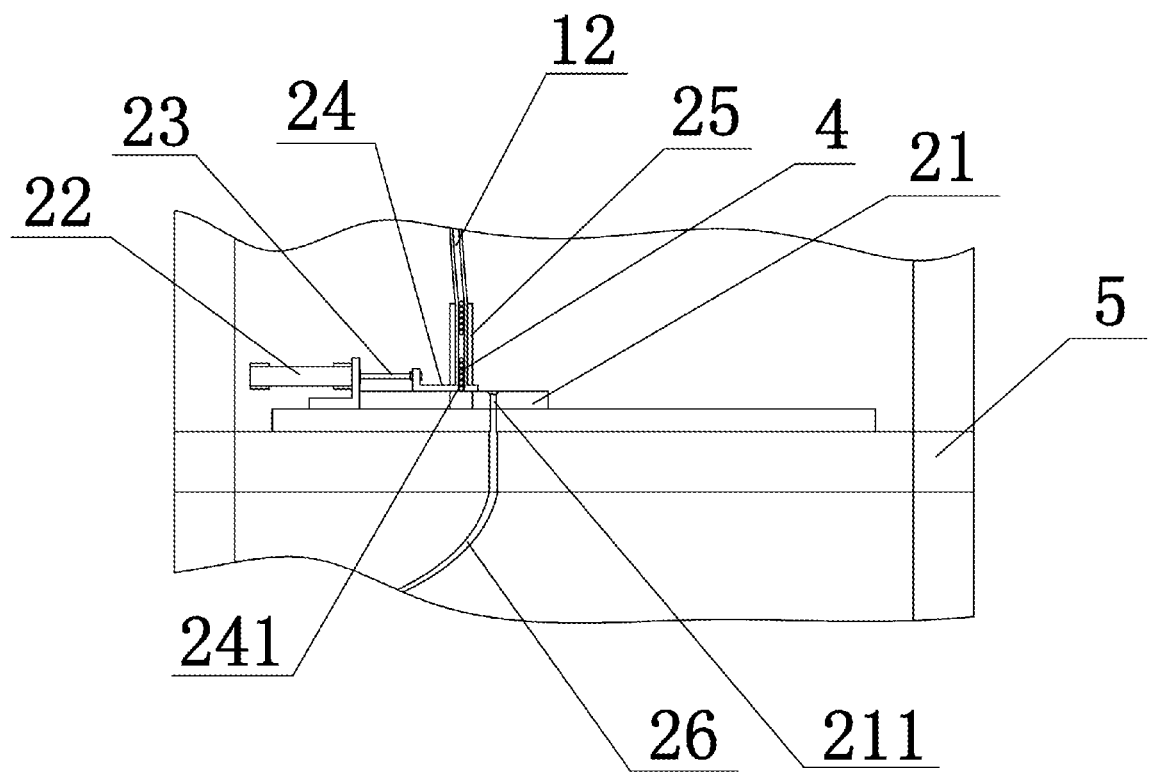
FIG. 3 shows the structure of the steel ball control unit mounted on the fixing rack in the present invention.
Figure 4:
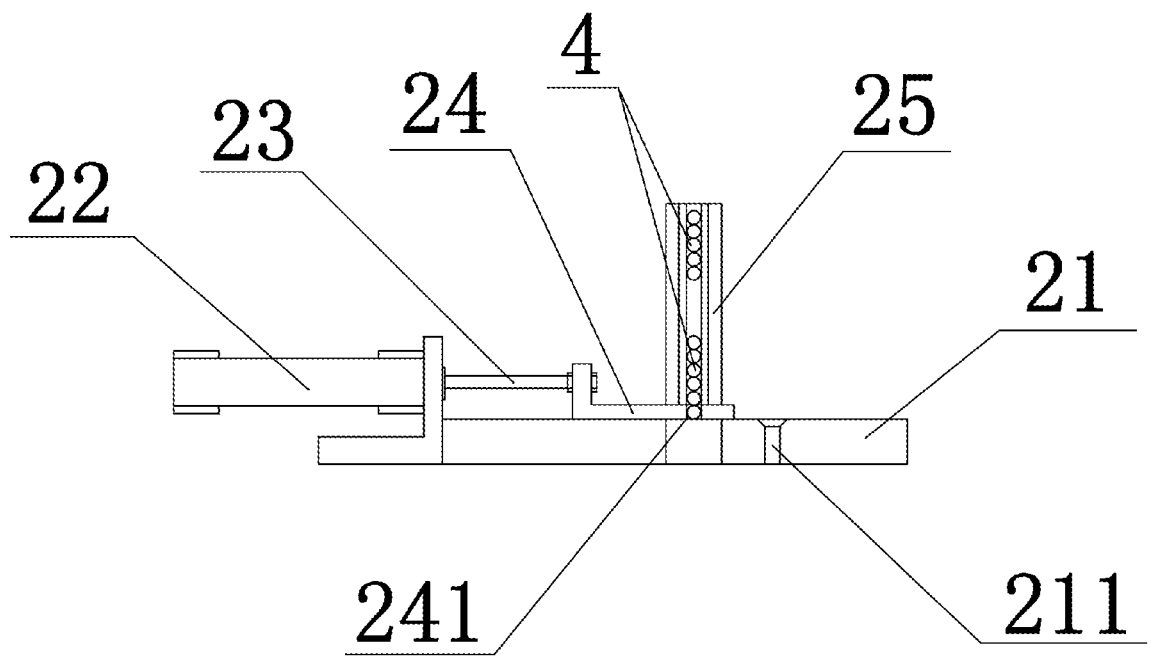
FIG. 4 shows the structure of the steel ball control unit in the present invention.
Figure 5:
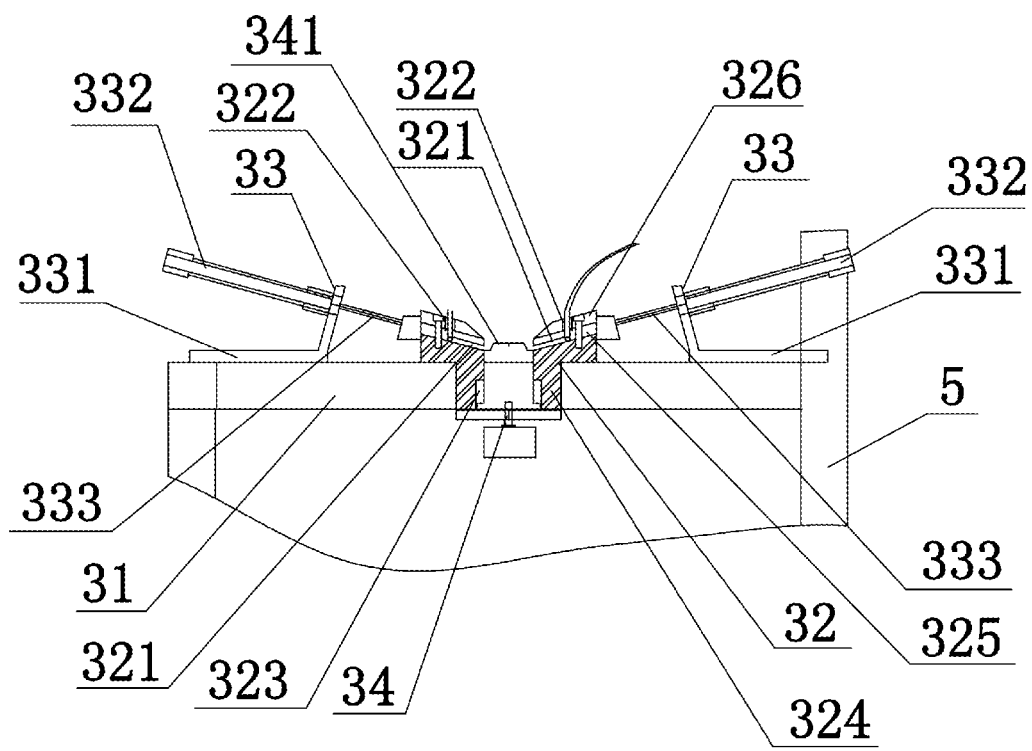
FIG. 5 shows the structure of the steel ball assembly unit in the present invention.
Figure 6:
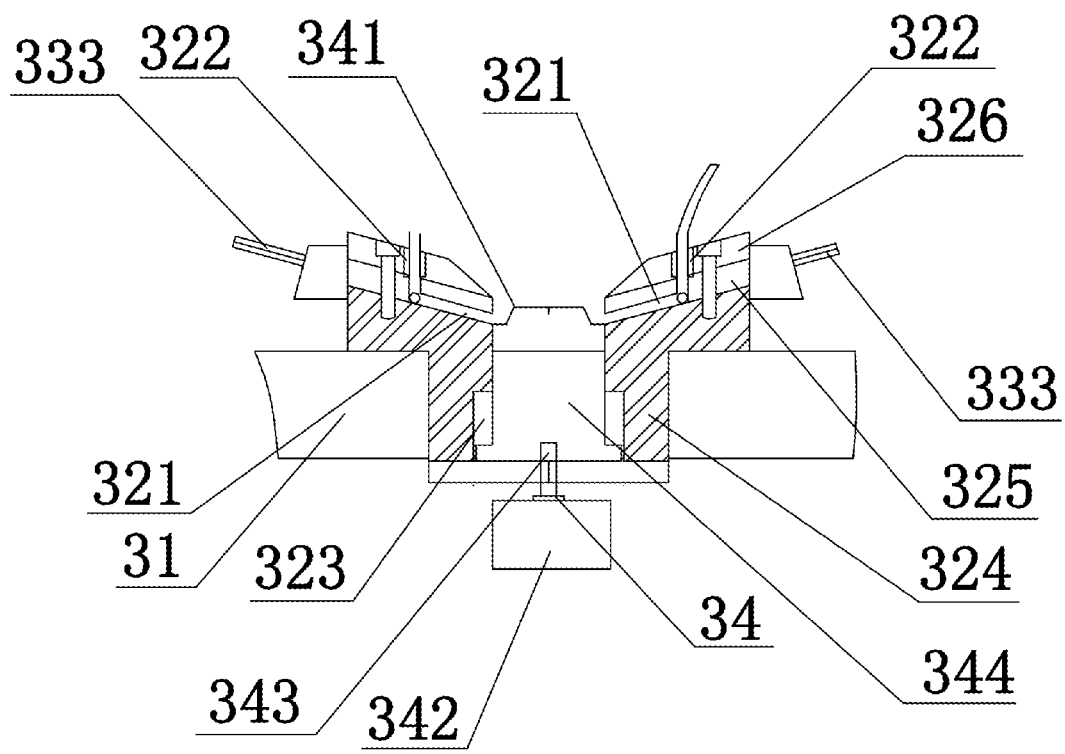
FIG. 6 shows a partial structure of the steel ball assembly unit in the present invention.

FIG. 1 shows the structure of the bearing ball assembly device in the present invention, reflects that the bearing ball assembly device consists of a steel ball output unit 1, a steel ball control unit 2 and a steel ball assembly unit 3, and also reflects the distribution of these three units on the fixing rack 4. FIG. 2 shows the structure of the steel ball output unit in the present invention, mainly reflects that the steel ball output unit 1 consists of steel ball storage containers 11 and steel ball output pipelines 12 and mainly reflects the structure of the steel ball output actuation unit 13. FIG. 3 shows the structure of the steel ball control unit mounted on the fixing rack in the present invention. FIG. 4 shows the structure of the steel ball control unit in the present invention, mainly reflects that the steel ball control unit 2 consists of a base 21, a second pressure unit 22, a telescopic push rod 23, a guide plate 24, a pipeline fixing piece 25 and steel ball guide pipes 26, and also reflects the connections between them. FIG. 5 shows the structure of the steel ball assembly unit in the present invention. FIG. 6 shows a partial structure of the steel ball assembly unit in the present invention, mainly reflects that the steel ball assembly unit 3 consists of a baseplate 31, a steel ball guide unit 32, a steel ball pressure exerting unit 33 and a retainer positioning unit 34, and also reflects the mechanical connections between them.

As shown in FIG. 1, the bearing ball assembly device comprises a steel ball output unit 1, a steel ball control unit 2 and a steel ball assembly unit 3; the steel ball output unit 1 is fit-connected to the steel ball control unit 2 and the steel ball control unit 2 is fit-connected to the steel ball assembly unit 3; the steel ball output unit 1 delivers steel balls 4 to the steel ball control unit 2, the steel ball control unit 2 allows a certain number of steel balls 4 to enter the steel ball assembly unit 3 each time, and the steel ball assembly unit 3 embeds steel balls 4 in a bearing retainer. With said structure adopted, the present invention can realize the automation of the assembly process of embedding steel balls into a bearing retainer, thus not only effectively reducing the labor consumption, but also effectively improving the working efficiency. The present invention is economic and practicable.

As shown in FIG. 1, in the present embodiment, the bearing ball assembly device further comprises a fixing rack 5, and the steel ball output unit 1, steel ball control unit 2 and steel assembly unit 3 are arranged on the fixing rack 5 and are distributed in turn from the top down. With said structure adopted, the present invention realizes the automatic delivery of most steel balls 4 by gravity. The present invention is structurally simple and practicable.

As shown in FIG. 2, in the present embodiment, the steel ball output unit 1 comprises steel ball storage containers 11 and steel ball output pipelines 12, the pipe diameter of the steel ball output pipelines 12 matches the diameter of steel balls 4, the tops of said steel ball output pipelines 12 communicate with the bottoms of the steel ball storage containers 11, and the bottoms of the steel ball output pipelines 12 are fit-connected to the steel ball control unit 2. With said structure adopted, the present invention is not only structurally simple, but also guarantees the continuous output of steel balls 4.

As shown in FIG. 2, in the present embodiment, the steel ball output unit 1 further comprises a steel ball output actuation unit 13, and said steel ball output actuation unit 13 actuates steel balls 4 in steel ball storage containers 11 to steadily enter steel ball output pipelines 12, thus further strengthening the capability of outputting steel balls 4 continuously and steadily.

As shown in FIG. 2, in the present embodiment, the steel ball output actuation unit 13 comprises a first pressure unit 131, a telescopic pressure rod 132, a lifting plate 133 and steel pipes 134; the first pressure unit 131 is fixed on the fixing rack 5, one end of the telescopic pressure rod 132 is fit-connected to the first pressure unit 131, the other end of the telescopic pressure rod 132 is fixedly connected to the lifting plate 133, and said lifting plate 133 is distributed under the steel ball storage containers 11; the tops of the steel pipes 134 are vertically inserted from the bottoms of the steel ball storage containers 11, and the bottoms of said steel pipes 134 are fixedly connected to the lifting plate 133; the steel pipes 134 are distributed in parallel to the telescopic pressure rod 132, and the hole diameter of the steel pipes 134 matches the diameter of steel balls 4; the tops of the steel ball output pipelines 12 communicate with the bottoms of the steel pipes 134; the first pressure unit 131 controls the telescopic movements of the telescopic pressure rod 132, said telescopic pressure rod 132 drives the lifting plate 133 to vertically move up and down, and said lifting plate 133 drives the steel pipes 134 to make telescopic movements in the steel pipe storage containers 11. With said steel ball output actuation unit adopted, steel balls 4 in the steel ball storage containers 11 are stirred by means of the telescopic movements of steel pipes 134 in the steel ball storage container, thus guaranteeing the steady delivery of steel balls 4. Wherein, the capability of continuously outputting steel balls 4 can be promoted by adding a vibrating unit, thus preventing steel pipes from being blocked.

As shown in FIG. 2, in the present embodiment, the steel ball output actuation unit 13 further comprises guide units 135, said guide unit 135 comprises a guide rod 1351, a spring 1352 and a spring mounting seat 1353, the spring mounting seat 1353 is fixed on the fixing rack 5, and the spring 1352 is fit-mounted in the spring mounting seat 1353; one end of the guide rod 1351 is fixedly connected to the lifting plate 133 and the other end of said guide rod 1351 passes through the spring mounting seat 1353 and the spring 1352 is put on the guide rod; the guide rod 1351 is distributed in parallel to the steel pipes 134. With said structure adopted, the present invention can effectively guarantee vertical and steady telescopic movements of steel pipes 134 in the steel ball storage containers 11.

As shown in FIGS. 3 and 4, in the present embodiment, the steel ball control unit 2 comprises a base 21, a second pressure unit 22, a telescopic push rod 23, a guide plate 24, a pipeline fixing piece 25 and steel ball guide pipes 26; the base 21 is fixedly mounted on the fixing rack 5, the second pressure unit 22 is fixedly mounted on the side of the base 21; one end of the telescopic push rod 23 is fit-connected to the second pressure unit 22, the telescopic push rod is distributed in parallel to the base 21, the other end of said telescopic push rod 23 is fixedly connected to the guide plate 24, and said guide plate 24 touches the top surface of the base 21; a through steel ball hole 241 is arranged on the guide plate 24, a through steel ball guide hole 211 is arranged on the base 21, and the line between the steel ball hole 241 and the steel ball guide hole 211 is parallel to the telescopic push rod 23; the hole diameter of both the steel ball hole 241 and steel ball guide hole 211 matches the diameter of steel balls 4, and the depth of said steel ball hole 241 also matches the diameter of steel balls; the pipeline fixing piece 25 is fixed on the base 21, the bottom of the steel ball output pipeline 12 is fixed on the pipeline fixing piece 25, the bottom opening of said steel ball output pipeline 12 is interconnected with the top opening of the steel ball hole 241; the top of said steel ball guide pipe 26 is interconnected with the bottom opening of the steel ball guide hole 211, and the bottom of said steel ball guide pipe 26 is fit-connected to the steel ball assembly unit 3.

With said structure adopted, the steel ball control unit 2 delivers only one steel ball 4 to the steel ball assembly unit 3 each time; when the steel ball control unit 2 works, the telescopic push rod 23 is driven by the second pressure unit 22 to draw back in position, the bottom opening of the steel ball output pipeline 12 is interconnected with the top opening of the steel ball hole 241, and at this time, one and only one steel ball 4 goes from the steel ball output pipeline 12 into the steel ball hole 241; when the telescopic push rod 23 is driven by the second pressure unit 22 to stretch out in position, the bottom opening of the steel ball hole 241 is interconnected with the top opening of the steel ball guide hole 211, and meanwhile the steel ball 4 in the steel ball hole 241 enters the steel ball guide hole 211 and is delivered to the steel ball assembly unit 3 along the steel ball guide pipe 26.

As shown in FIGS. 5 and 6, in the present embodiment, the steel ball assembly unit 3 comprises a baseplate 31, a steel ball guide unit 32, steel ball pressure exerting units 33 and a retainer positioning unit 34; the baseplate 31 is horizontally fixed on the fixing rack 5, the steel ball guide unit 32 is fixed on the top surface of the baseplate 31, the retainer positioning unit 34 is fit-mounted in the middle of the steel ball guide unit 32, a tapered boss 341 for placing the bearing retainer is arranged at the top of the retainer positioning unit 34; a plurality of steel ball guide holes 321 whose outer side is high and inner side is low are arranged in the middle of the steel ball guide unit 32, the diameter of said steel ball guide hole 321 matches the diameter of steel balls 4, all steel ball guide holes 321 are evenly distributed in a circle array with the central line of the retainer positioning unit 34 as an axis; connection holes 322 whose number is equal to the number of steel ball guide holes 321 are opened at the top of the steel ball guide unit 32, the bottom of each connection hole 322 communicates with a corresponding steel ball guide hole 321 and the top of each connection hole 322 communicates with a steel ball guide pipe 26; the number of the steel ball pressure exerting units 33 is equal to the number of the steel ball guide holes 321 and a one-to-one correspondence exists between them, and each steel ball pressure exerting unit 33 embeds a steel ball 4 into the bearing retainer through the matched steel ball guide hole 321. In the present invention, the retainer is fixed on the tapered boss 341 of the retainer positioning unit 34, a steel ball 4 is directed to roll to the corresponding mounting position on the retainer, then the steel ball pressure exerting unit 33 exerts a pressure on the steel ball 4 to squeeze the steel ball into a corresponding mounting hole of the retainer, and thus the function of automatically embedding the steel ball 4 in the retainer is realized. Wherein, a positioning block is further arranged on the tapered boss 341, and said positioning block is put in a steel ball mounting hole so as to fix the retainer.

As shown in FIGS. 5 and 6, in the present embodiment, a positioning mounting hole 323 coaxial with the steel ball guide unit 32 and matching the retainer positioning unit 34 is opened in the middle of the steel ball guide unit 32, and said retainer positioning unit 34 is put in the positioning mounting hole 323 and is fixedly connected to the bottom surface of the baseplate (31); the steel ball guide unit 32 comprises a coaxially distributed base 324, a steel ball guide disk 325 and a top disk 326 in turn from the top down, said base 324, steel ball guide disk 325 and top disk 326 are fixedly connected with bolts, and said steel ball guide hole 321 is arranged on the steel ball guide disk 325; said steel ball pressure exerting unit 33 comprises an L-shaped bent plate 331, a third pressure unit 332 and telescopic pressure rod 333; one side of said L-shaped bent plate 331 is horizontally fixed to the top surface of the baseplate 31, and the other side of said L-shaped bent plate 331 is distributed perpendicular to the axis of the corresponding matched steel ball guide hole 321; the third pressure unit 332 is fixedly connected to the L-shaped bent plate 331; the front end of said telescopic pressure rod 333 protrudes into the corresponding matched steel ball guide hole 321 and the end of said telescopic pressure rod 333 is fit-connected to the third pressure unit 332; the telescopic pressure rod 333 can be driven by the third pressure unit 332 to make telescopic movements in the steel ball guide hole 321. Wherein, the retainer positioning unit 34 comprises a fourth pressure unit 342, a vertical telescopic rod 343 and a retainer mounting table 344 matching the positioning mounting hole 323, and said tapered boss 341 is arranged at the top of the retainer mounting table 344; the fourth pressure unit 342 is fixedly mounted on the bottom surface of the baseplate 31; the bottom of said vertical telescopic rod 343 is fit-connected to the fourth pressure unit 342, and the top of said vertical telescopic rod 343 is fixedly connected to the bottom of the retainer mounting table 344; the retainer mounting table 344 is put into the positioning mounting hole 323; the vertical telescopic movement of the retainer mounting table 344 is realized by controlling the fourth pressure unit 342 so that the operator can conveniently place/remove a bearing retainer on/from the tapered boss 341.

In the present embodiment, the included angle between the steel ball guide hole 321 and the horizontal plane is 10° to 20°, and preferably, the included angle between said steel ball guide hole 321 and the horizontal plane is 15°; not only can a steel ball 4 be guaranteed to successfully roll to a corresponding position in the retainer by gravity, but also too high a speed at which the steel ball may bounce out of the retainer can be prevented.

Wherein, a control unit is provided for the present invention, and the control unit uniformly controls the first pressure unit 131, the second pressure unit 22, the third pressure unit 332 and the fourth pressure unit 342.

Only the preferred embodiment of the present invention is described above. It should be noted that those skilled in the art can make improvements and modifications without departing from the technical principle of the present invention and these improvements and modifications should also fall within the scope of protection of the present invention.

What is claimed is:

1. A bearing ball assembly device, characterized in that said bearing ball assembly device comprises a steel ball output unit, a steel ball control unit and a steel ball assembly unit, wherein said steel ball output unit is fit-connected to said steel ball control unit, said steel ball control unit is fit-connected to said steel ball assembly unit, said steel ball output unit delivers steel balls to said steel ball control unit, said steel ball control unit allows a certain number of steel balls to enter said steel ball assembly unit each time, and said steel ball assembly unit embeds steel balls in a bearing retainer, said bearing ball assembly device further comprises a fixing rack, and said steel ball output unit, steel ball control unit and steel ball assembly unit are arranged on the fixing rack and are distributed in turn from the top down; said steel ball output unit comprises steel ball storage containers and steel ball output pipelines, wherein the pipe diameter of said steel ball output pipelines matches the diameter of steel balls, the tops of said steel ball output pipelines communicate with the bottoms of said steel ball storage containers, and the bottoms of said steel ball output pipelines are fit-connected to said steel ball control unit; said steel ball output unit further comprises a steel ball output actuation unit, wherein said steel ball output actuation unit actuates steel balls in steel ball storage containers to steadily enter steel ball output pipelines; said steel ball output actuation unit comprises a first pressure unit, a telescopic pressure rod, a lifting plate and steel pipes, wherein said first pressure unit is fixed on the fixing rack, one end of said telescopic pressure rod is fit-connected to the first pressure unit, the other end of said telescopic pressure rod is fixedly connected to the lifting plate, said lifting plate is distributed under the steel ball storage containers, the tops of said steel pipes are vertically inserted from the bottoms of the steel ball storage containers, the bottoms of said steel pipes are fixedly connected to the lifting plate, said steel pipes are distributed in parallel to the telescopic pressure rod, the hold diameter of said steel pipes matches the diameter of steel balls, and the tops of said steel ball output pipelines communicate with the bottoms of said steel pipes;

said first pressure unit controls the telescopic movements of the telescopic pressure rod, said telescopic pressure rod drives the lifting plate to vertically move up and down, and said lifting plate drives the steel pipes to make telescopic movements in the steel pipe storage containers.

2. The bearing ball assembly device as claimed in claim 1, characterized in that said steel ball output actuation unit further comprises guide units, said guide unit comprises a guide rod, a spring and a spring mounting seat, said spring mounting seat is fixed on the fixing rack, and said spring is fit-mounted in said spring mounting seat; one end of said guide rod is fixedly connected to the lifting plate and the other end of said guide rod passes through the spring mounting seat and the spring is put on said guide rod; the guide rod is distributed in parallel to the steel pipes.

3. The bearing ball assembly device as claimed in claim 1, characterized in that said steel ball control unit comprises a base, a second pressure unit, a telescopic push rod, a guide plate, a pipeline fixing piece and steel ball guide pipes; said base is fixedly mounted on the fixing rack, said second pressure unit is fixedly mounted on the side of the base; one end of said telescopic push rod is fit-connected to the second pressure unit, said telescopic push rod is distributed in parallel to the base, the other end of said telescopic push rod is fixedly connected to the guide plate, and said guide plate touches the top surface of the base; a through steel ball hole is arranged on the guide plate, a through steel ball guide hole is arranged on the base, and the line between said steel ball hole and said steel ball guide hole is parallel to the telescopic push rod; the hole diameter of both said steel ball hole and steel ball guide hole matches the diameter of steel balls, and the depth of said steel ball hole also matches the diameter of steel balls; said pipeline fixing piece is fixed on the base, the bottom of said steel ball output pipeline is fixed on the pipeline fixing piece, the bottom opening of said steel ball output pipeline is interconnected with the top opening of the steel ball hole; the top of said steel ball guide pipe is interconnected with the bottom opening of the steel ball guide hole, and the bottom of said steel ball guide pipe is fit-connected to the steel ball assembly unit;

when the telescopic push rod is driven by the second pressure unit to draw back in position, the bottom opening of the steel ball output pipeline is interconnected with the top opening of the steel ball hole, and at this time, one and only one steel ball goes from the steel ball output pipeline into the steel ball hole; when the telescopic push rod is driven by the second pressure unit to stretch out in position, the bottom opening of the steel ball hole is interconnected with the top opening of the steel ball guide hole, and meanwhile the steel ball in the steel ball hole enters the steel ball guide hole and is delivered to the steel ball assembly unit along the steel ball guide pipe.

4. The bearing ball assembly device as claimed in claim 3, characterized in that said steel ball assembly unit comprises a baseplate, a steel ball guide unit, steel ball pressure exerting units and a retainer positioning unit; said baseplate is horizontally fixed on the fixing rack, said steel ball guide unit is fixed on the top surface of the baseplate, said retainer positioning unit is fit-mounted in the middle of the steel ball guide unit, a tapered boss for placing the bearing retainer is arranged at the top of the retainer position unit; a plurality of steel ball guide holes whose outer side is high and inner side is low are arranged in the middle of the steel ball guide unit, the diameter of said steel ball guide hole matches the diameter of steel balls, all steel ball guide holes are evenly distributed in a circle array with the central line of the retainer positioning unit as an axis; connection holes whose number is equal to the number of steel ball guide holes are opened at the top of the steel ball guide unit, the bottom of each connection hole communicates with a corresponding steel ball guide hole and the top of each connection hole communicates with a steel ball guide pipe; the number of said steel ball pressure exerting units is equal to the number of the steel ball guide holes and a one-to-one correspondence exists between them, and each steel ball pressure exerting unit embeds a steel ball into the bearing retainer through the matched steel ball guide hole.

5. The bearing ball assembly device as claimed in claim 4, characterized in that a positioning mounting hole coaxial with said steel ball guide unit and matching the retainer positioning unit is opened in the middle of said steel ball guide unit, and said retainer positioning unit is put in the positioning mounting hole and is fixedly connected to the bottom surface of the baseplate;

said steel ball guide unit comprises a coaxially distributed base, a steel ball guide disk and a top disk in turn from the top down, said base, steel ball guide disk and top disk are fixedly connected with bolts, and said steel ball guide hole is arranged on the steel ball guide disk;

said steel ball pressure exerting unit comprises an L-shaped bent plate, a third pressure unit and a telescopic pressure rod; one side of said L-shaped bent plate is horizontally fixed to the top surface of the baseplate, and the other side of said L-shaped bent plate is distributed perpendicular to the axis of the corresponding matched steel ball guide hole; said third pressure unit is fixedly connected to the L-shaped bent plate; the front end of said telescopic pressure rod protrudes into the corresponding matched steel ball guide hole and the end of said telescopic pressure rod is fit-connected to the third pressure unit; the telescopic pressure rod can be driven by the third pressure unit to make telescopic movements in the steel ball guide hole.

6. The bearing ball assembly device as claimed in claim 5, characterized in that the included angle between said steel ball guide hole and the horizontal plane is 15°.

* * * * *